US012736993B2

(12) United States Patent
Chen et al.

(10) Patent No.: US 12,736,993 B2
(45) Date of Patent: Sep. 15, 2026

(54) VOLTAGE REFERENCE APPARATUS AND CONTROL METHOD

(71) Applicant: Reed Semiconductor Corporation, Warwick, RI (US)

(72) Inventors: Hal Chen, Short Hills, NJ (US); Jialun Du, Powell, OH (US); Jiwei Fan, Cary, NC (US)

(73) Assignee: Reed Semiconductor Corporation, Warwick, RI (US)

( * ) Notice: Subject to any disclaimer, the term of this patent is extended or adjusted under 35 U.S.C. 154(b) by 248 days.

(21) Appl. No.: 18/630,903

(22) Filed: Apr. 9, 2024

(65) Prior Publication Data

US 2025/0315071 A1 Oct. 9, 2025

(51) Int. Cl.
*G05F 3/20* (2006.01)
*G05F 3/24* (2006.01)

(52) U.S. Cl.
CPC .................................... *G05F 3/24* (2013.01)

(58) Field of Classification Search
CPC ................ G05F 3/16; G05F 3/20; G05F 3/24
See application file for complete search history.

(56) References Cited

U.S. PATENT DOCUMENTS

| | | | | |
|---|---|---|---|---|
| 5,369,354 A * | 11/1994 | Mori | G05F 3/24 | 323/313 |
| 6,108,247 A * | 8/2000 | Suzu | G11C 5/147 | 365/189.11 |
| 6,275,100 B1 * | 8/2001 | Park | G05F 3/247 | 327/543 |
| 11,681,318 B2 * | 6/2023 | Ooiwa | G11C 16/30 | 327/540 |
| 11,953,927 B2 * | 4/2024 | Yuh | G05F 3/24 | |

* cited by examiner

*Primary Examiner* — Adolf D Berhane
(74) *Attorney, Agent, or Firm* — AP3 Law Firm PLLC

(57) ABSTRACT

An apparatus includes a first resistor, a first negative threshold transistor, a second resistor and a second negative threshold transistor coupled in series between a first voltage bus and a second voltage bus, and a first positive threshold transistor connected between a common node of the second resistor and the first negative threshold transistor, and the first voltage bus, wherein a first reference voltage is generated on a first reference voltage bus, and wherein the first reference voltage bus is coupled to a common node of a drain/source terminal of the second negative threshold transistor and the second resistor.

20 Claims, 9 Drawing Sheets

VOLTAGE REFERENCE APPARATUS AND CONTROL METHOD

TECHNICAL FIELD

The present invention relates to a voltage reference apparatus and control method, and, in particular embodiments, to a voltage reference apparatus formed by field effect transistors.

BACKGROUND

A voltage reference in an integrated circuit is a circuit that generates a stable and accurate voltage output regardless of variations in supply voltage or temperature. It provides a reliable reference voltage against which other voltages in the integrated circuit can be compared or regulated. Voltage references are crucial elements in many electronic systems where precise voltage levels are required for proper operation.

The primary principle behind a voltage reference is to utilize a stable voltage source or a precise voltage divider network that can generate a constant output voltage despite fluctuations in operating conditions. In an integrated circuit, a voltage reference can be implemented in various ways. For example, the voltage reference can be obtained based on bandgap voltage references, Zener diodes, or any other circuits designed to produce a consistent voltage output. Voltage references often include circuitry to compensate for various factors such as temperature changes, supply voltage variations, aging effects and the like. These compensation techniques ensure that the output voltage of a voltage reference remains stable over time and under different operating conditions. Voltage references are widely employed in various electronic systems, including analog-to-digital converters (ADCs), digital-to-analog converters (DACs), voltage regulators, sensor interfaces, precision measurement equipment and the like.

A voltage reference may be formed by a bipolar junction transistor. This voltage reference utilizes the inherent characteristics of the bipolar junction transistor to produce a stable and accurate voltage output. One common circuit configuration for creating a voltage reference using a bipolar junction transistor is called a bandgap voltage reference. This type of reference is widely used due to its relatively high accuracy and stability over various operating conditions. While bandgap voltage references using bipolar junction transistors offer many advantages, they also have limitations. For example, a bandgap voltage reference takes up a large amount of space on a semiconductor chip.

A field-effect transistor (FET) is a type of transistor commonly used in electronic devices for amplification or switching signals. It operates based on the principle of an electric field controlling the conductivity of a channel in a semiconductor material. A FET includes four terminals, namely a source, a drain, a gate and a body/bulk. The source and the drain are connected to the ends of a conducting channel. The gate terminal is used to control the conductivity of the channel. The body/bulk terminal is connected to the back of the channel. When a voltage is applied to the gate terminal, it creates an electric field that modulates the conductivity of the channel, allowing the FET to amplify or switch electronic signals.

A FET with a negative threshold voltage is a transistor having a negative gate-source voltage when the transistor begins to conduct. The threshold voltage of a transistor is the minimum voltage that must be applied between the gate and source terminals to establish a conducting channel between the source and drain terminals. For a typical FET, this voltage is positive. In a FET with a negative threshold voltage, the threshold voltage is negative. This means that applying a negative voltage to the gate relative to the source can turn on the transistor.

The bandgap voltage reference is accurate. However, the bandgap voltage reference occupies a large amount of space on a semiconductor chip. In some applications, higher precision and accuracy are not needed. It would be desirable to have a simple and reliable voltage reference for use in these applications exhibiting good characteristics. For example, this simple and reliable voltage reference does not occupy a large amount of space on a semiconductor chip. The present disclosure addresses this need.

SUMMARY

These and other problems are generally solved or circumvented, and technical advantages are generally achieved, by preferred embodiments of the present disclosure which provide a voltage reference apparatus formed by field effect transistors.

In accordance with an embodiment, an apparatus comprises a first resistor, a first negative threshold transistor, a second resistor and a second negative threshold transistor coupled in series between a first voltage bus and a second voltage bus, and a first positive threshold transistor connected between a common node of the second resistor and the first negative threshold transistor, and the first voltage bus, wherein a first reference voltage is generated on a first reference voltage bus, and wherein the first reference voltage bus is coupled to a common node of a drain/source terminal of the second negative threshold transistor and the second resistor.

In accordance with another embodiment, a method comprises providing a first voltage reference apparatus comprising a first resistor, a first negative threshold transistor, a second resistor and a second negative threshold transistor coupled in series between a first voltage bus and a second voltage bus, and a first positive threshold transistor connected between a common node of the second resistor and the first negative threshold transistor, and the first voltage bus, and configuring the first voltage reference apparatus to generate a first reference voltage on a first reference voltage bus, wherein the first reference voltage is equal to a sum of a voltage on the first voltage bus, a gate-to-source voltage of the first positive threshold transistor and a source-to-gate voltage of the second negative threshold transistor.

In accordance with yet another embodiment, a system comprises a plurality of voltage reference apparatuses stacked over one another between a first voltage bus and a second voltage bus to form a voltage reference system configured to generate a plurality of reference voltages, wherein each voltage reference apparatus comprises two resistors and two negative threshold transistors coupled in series, and one positive threshold transistor connected in parallel with a circuit branch comprising one negative threshold transistor and one resistor connected in series.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a voltage reference apparatus formed by field effect transistors. The disclosure may also be applied, however, to a variety of reference circuits. Hereinafter, various embodiments will be explained in detail with reference to the accompanying drawings.

Figure 1:
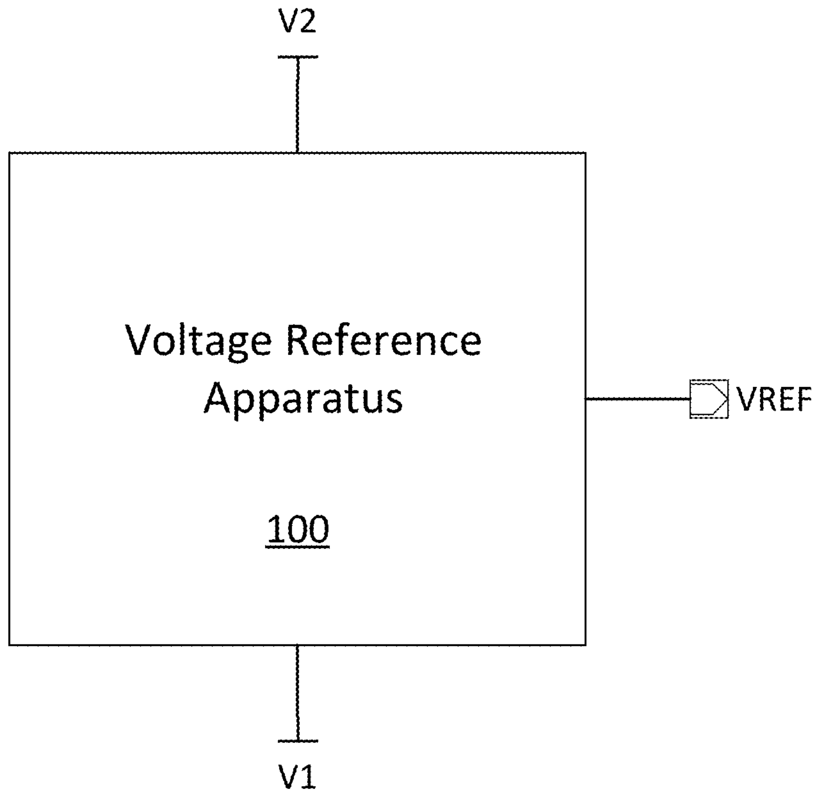
FIG. 1 illustrates a block diagram of a voltage reference apparatus in accordance with various embodiments of the present disclosure.

FIG. 1 illustrates a block diagram of a voltage reference apparatus in accordance with various embodiments of the present disclosure. The voltage reference apparatus 100 is coupled between a first voltage bus V1 and a second voltage bus V2. The voltage reference apparatus 100 is configured to generate a reference voltage VREF.

In some embodiments, the voltage reference apparatus 100 comprises an upper field effect transistor (FET), an upper resistor, a first lower field effect transistor, a lower resistor and a second lower field effect transistor. The upper field effect transistor is a transistor with a negative threshold voltage. The upper field effect transistor and the upper resistor form a sourcing current path. The first lower field effect transistor is a transistor with a negative threshold voltage. The first lower field effect transistor and the lower resistor form a sinking current path. A sourcing current flowing through the sourcing current path is designed to be greater than a sinking current flowing through the sinking current path. The difference between the sourcing current and the sinking current is a residual current flowing through the second lower field effect transistor that has a positive threshold voltage.

In some embodiments, the reference voltage VREF is equal to the sum of the voltage on the first voltage bus, the source-to-gate voltage of the upper field effect transistor and the gate-to-source voltage of the second lower field effect transistor. The values of the upper resistor and the lower resistor are chosen to achieve a desirable temperature coefficient for the reference voltage VREF. In some embodiments, the temperature coefficient is zero. In alternative embodiments, other temperature coefficient values can also be employed to satisfy the design requirements.

In comparison with the traditional BJT-based or diode-based voltage reference circuits, the FET-based voltage reference circuit (e.g., voltage reference apparatus 100) has some advantages. A first advantageous feature of the voltage reference apparatus 100 shown in FIG. 1 is that only a small number of FET devices are used in the voltage reference apparatus 100. This indicates that the voltage reference apparatus 100 only occupies a small amount of space in a semiconductor chip. A second advantageous feature of the voltage reference apparatus 100 shown in FIG. 1 comes from the open-loop nature of the voltage reference apparatus 100. The voltage reference apparatus 100 does not include a global feedback loop. This means its transient performance is unencumbered by stability and bandwidth concerns associated with feedback control loops, thus allowing the voltage reference output to settle extremely fast. A third advantageous feature of the voltage reference apparatus 100 shown in FIG. 1 comes from the fact that many semiconductor processes allow low-voltage n-type FET structures to be fully isolated from the substrate of the semiconductor chip, thereby allowing the body/bulk terminal of the n-type FET to be connected to its source terminal or another convenient circuit node. This means a FET-based voltage reference circuit that is fully isolated from the substrate can even operate under fast-moving dynamic supply rails. Combined with its remarkably fast transient response and settling characteristics, the FET-based voltage reference circuit excels in delivering an output voltage that adeptly follow and track the fast-moving dynamic supply rails.

In some embodiments, the output voltage of the FET-based voltage reference circuit (e.g., voltage reference apparatus 100) may not be as precise and accurate as the traditional BJT-based or diode-based voltage reference circuits. However, for many applications, such as power-on reset and power supply threshold detection, the precision and accuracy of the FET-based voltage reference circuit (e.g., voltage reference apparatus 100) are good enough. In some applications where higher precision and accuracy are needed, additional trim circuitry can be added into this FET-based voltage reference circuit to further improve its precision and accuracy.

Figure 2:
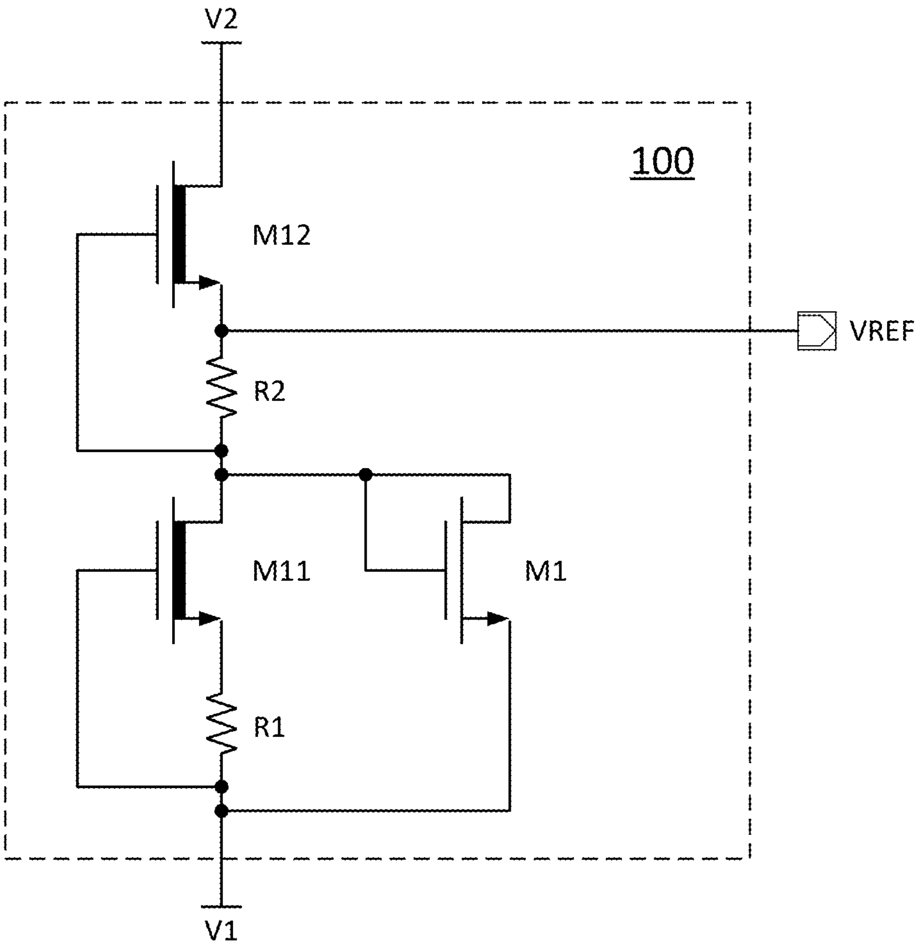
FIG. 2 illustrates a schematic diagram of a first implementation of the voltage reference apparatus shown in FIG. 1 in accordance with various embodiments of the present disclosure.

FIG. 2 illustrates a schematic diagram of a first implementation of the voltage reference apparatus shown in FIG. 1 in accordance with various embodiments of the present disclosure. The voltage reference apparatus 100 is coupled between a first voltage bus V1 and a second voltage bus V2. The voltage reference apparatus 100 is configured to generate a reference voltage VREF at the output node (VREF).

The voltage reference apparatus 100 comprise a first resistor R1, a first negative threshold transistor M11, a second resistor R2, a second negative threshold transistor M12 and a positive threshold transistor M1. The first negative threshold transistor M11, the second negative threshold transistor M12 and the positive threshold transistor M1 are n-type FET devices.

As shown in FIG. 2, the first resistor R1, the first negative threshold transistor M11, the second resistor R2 and the second negative threshold transistor M12 are coupled in series between the first voltage bus V1 and the second voltage bus V2. The positive threshold transistor M1 is connected between a common node of the second resistor R2 and the first negative threshold transistor M11, and the first voltage bus V1.

As shown in FIG. 2, a drain of the first negative threshold transistor M11 is connected to the second resistor R2. A source of the first negative threshold transistor M11 is connected to the first resistor R1. A gate of the first negative threshold transistor M11 is connected to the first voltage bus V1. The first negative threshold transistor M11 is an n-type FET with a negative threshold voltage. R1 is connected between the source and gate terminals of the first negative threshold transistor M11. The configuration of R1 and M11 shown in FIG. 2 induces a current to flow through the first negative threshold transistor M11.

As shown in FIG. 2, a drain of the second negative threshold transistor M12 is connected to the second voltage bus V2. A source of the second negative threshold transistor M12 is connected to the second resistor R2. A gate of the second negative threshold transistor M12 is connected to the common node of the second resistor R2 and the first negative threshold transistor M11. The second negative threshold transistor M12 is an n-type FET with a negative threshold voltage. R2 is connected between the source and gate terminals of the second negative threshold transistor M12. The configuration of R2 and M12 shown in FIG. 2 induces a current to flow through the second negative threshold transistor M12.

As shown in FIG. 2, a drain of the positive threshold transistor M1 is connected to the common node of the second resistor R2 and the first negative threshold transistor M11. A source of the positive threshold transistor M1 is connected to the first voltage bus V1. A gate of the positive threshold transistor M1 is connected to the common node of the second resistor R2 and the first negative threshold transistor M11. The positive threshold transistor M1 is an n-type FET with a positive threshold voltage. As shown in FIG. 2, the gate and the drain of the positive threshold transistor M1 are connected together to form a diode-connected transistor structure.

In some embodiments, the first voltage bus V1 is connected to ground. The second voltage bus V2 is connected to any suitable voltage sources such as a bias voltage source having a sufficient voltage headroom to support normal circuit operation. Under this system configuration, VREF output is simply a reference voltage with respect to ground. In alternative embodiments, the first voltage bus V1 can be connected to any circuit node capable of sinking the total bias current flowing in the FET-based voltage reference circuit. Likewise, the second voltage bus V2 can be connected to any circuit node capable of sourcing the total bias current flowing in the FET-based voltage reference circuit. It should be noted that the voltage difference between the second voltage bus V2 and the first voltage bus V1 must be sufficiently large to support normal circuit operation. It should further be noted that when the FET devices in this FET-based voltage reference circuit are completely isolated from the semiconductor substrate (e.g., a silicon substrate), V1 and V2 can be connected to supply rails or circuit nodes that are dynamically shifting.

Figure 3:
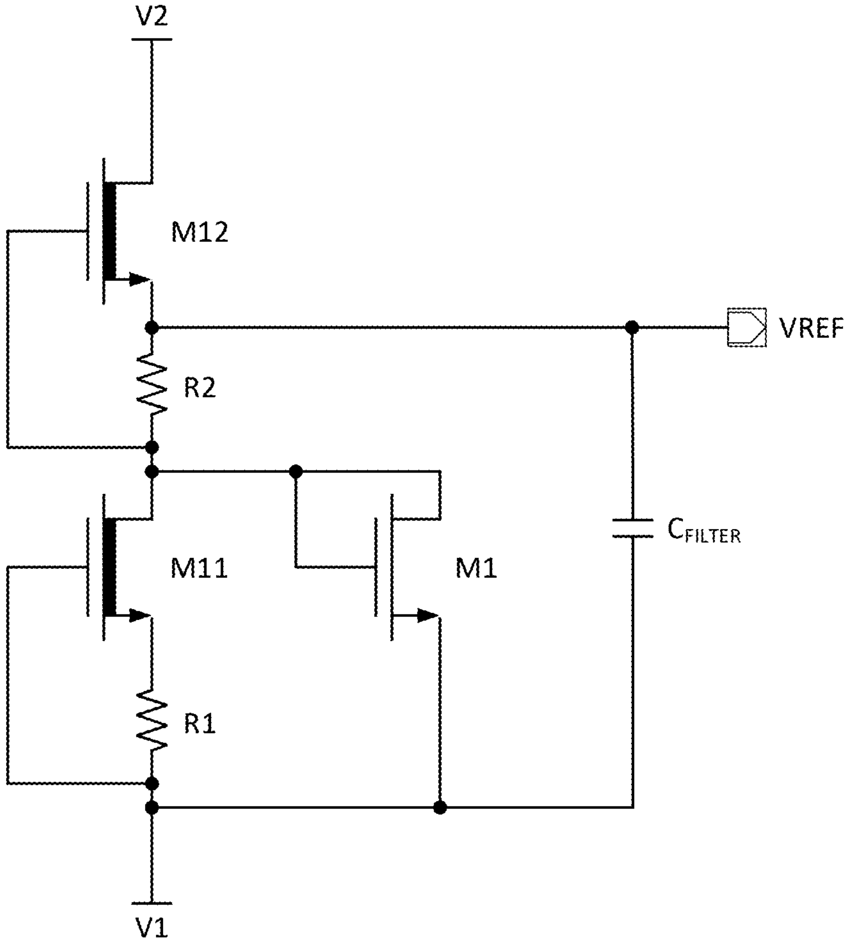
FIG. 3 illustrates a schematic diagram of a second implementation of the voltage reference apparatus shown in FIG. 1 in accordance with various embodiments of the present disclosure.

FIG. 3 illustrates a schematic diagram of a second implementation of the voltage reference apparatus shown in FIG. 1 in accordance with various embodiments of the present disclosure. The second implementation of the voltage reference apparatus shown in FIG. 3 is similar to the first implementation of the voltage reference apparatus shown in FIG. 2 except that a capacitor $C_{FILTER}$ is connected between the common node of the second resistor R2 and the second negative threshold transistor M12, and the first voltage bus V1. The capacitor $C_{FILTER}$ is employed to filter and mitigate any noise or disturbance that might exist at the output node (VREF).

Figure 4:
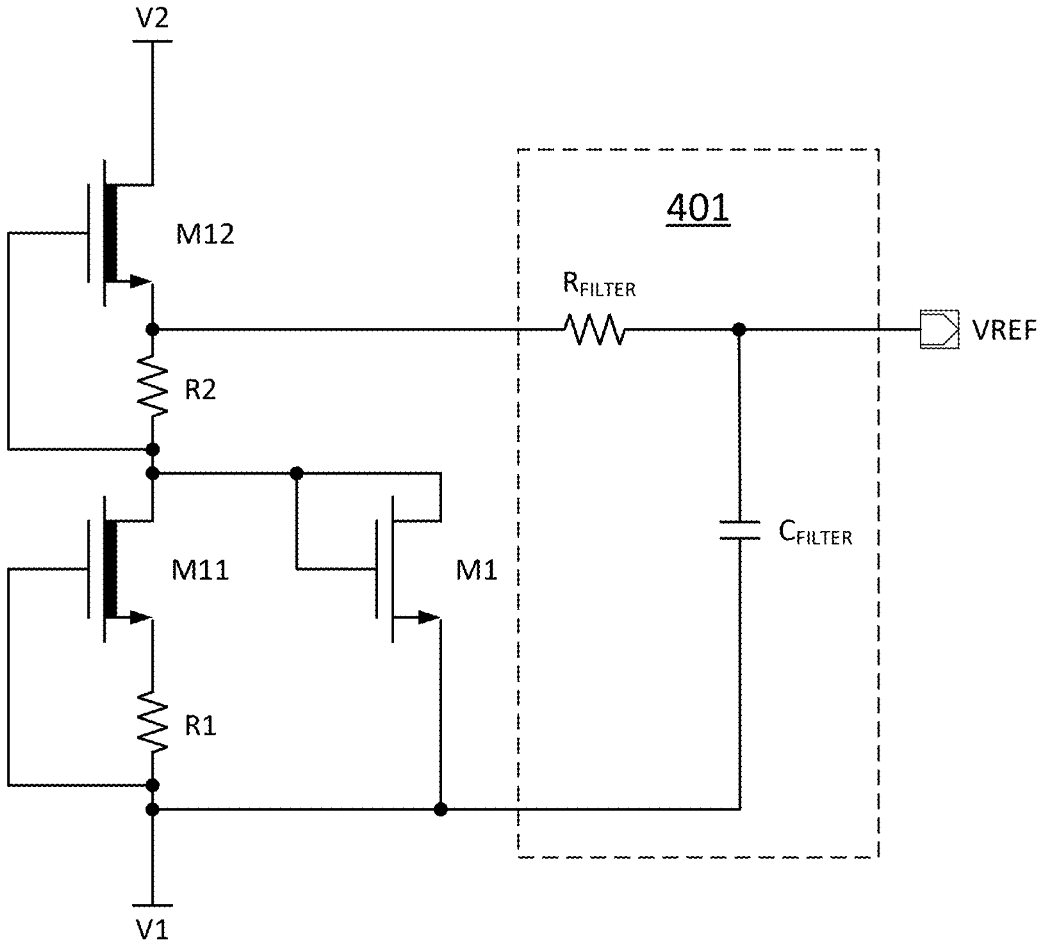
FIG. 4 illustrates a schematic diagram of a third implementation of the voltage reference apparatus shown in FIG. 1 in accordance with various embodiments of the present disclosure.

FIG. 4 illustrates a schematic diagram of a third implementation of the voltage reference apparatus shown in FIG. 1 in accordance with various embodiments of the present disclosure. The third implementation of the voltage reference apparatus shown in FIG. 4 is similar to the first implementation of the voltage reference apparatus shown in FIG. 2 except that a low-pass filter 401 is connected between the common node of the second resistor R2 and the second negative threshold transistor M12, and the first voltage bus V1. The low-pass filter 401 is formed by a resistor $R_{FILTER}$ and a capacitor $C_{FILTER}$ as shown in FIG. 4. The resistor $R_{FILTER}$ is connected between the common node of the second resistor R2 and the second negative threshold transistor M12, and the reference voltage bus (VREF). The capacitor $C_{FILTER}$ is connected between the reference voltage bus (VREF) and the first voltage bus V1. The low-pass filter 401 is employed to filter and mitigate any noise or disturbance that might exist at the reference voltage bus (VREF).

It should be noted that the diagram of the low-pass filter 401 is merely an example, which should not unduly limit the scope of the claims. One of ordinary skill in the art would recognize many variations, alternatives, and modifications. For example, depending on design needs and different applications, the low-pass filter 401 could accommodate any number of resistors and capacitors.

Figure 5:
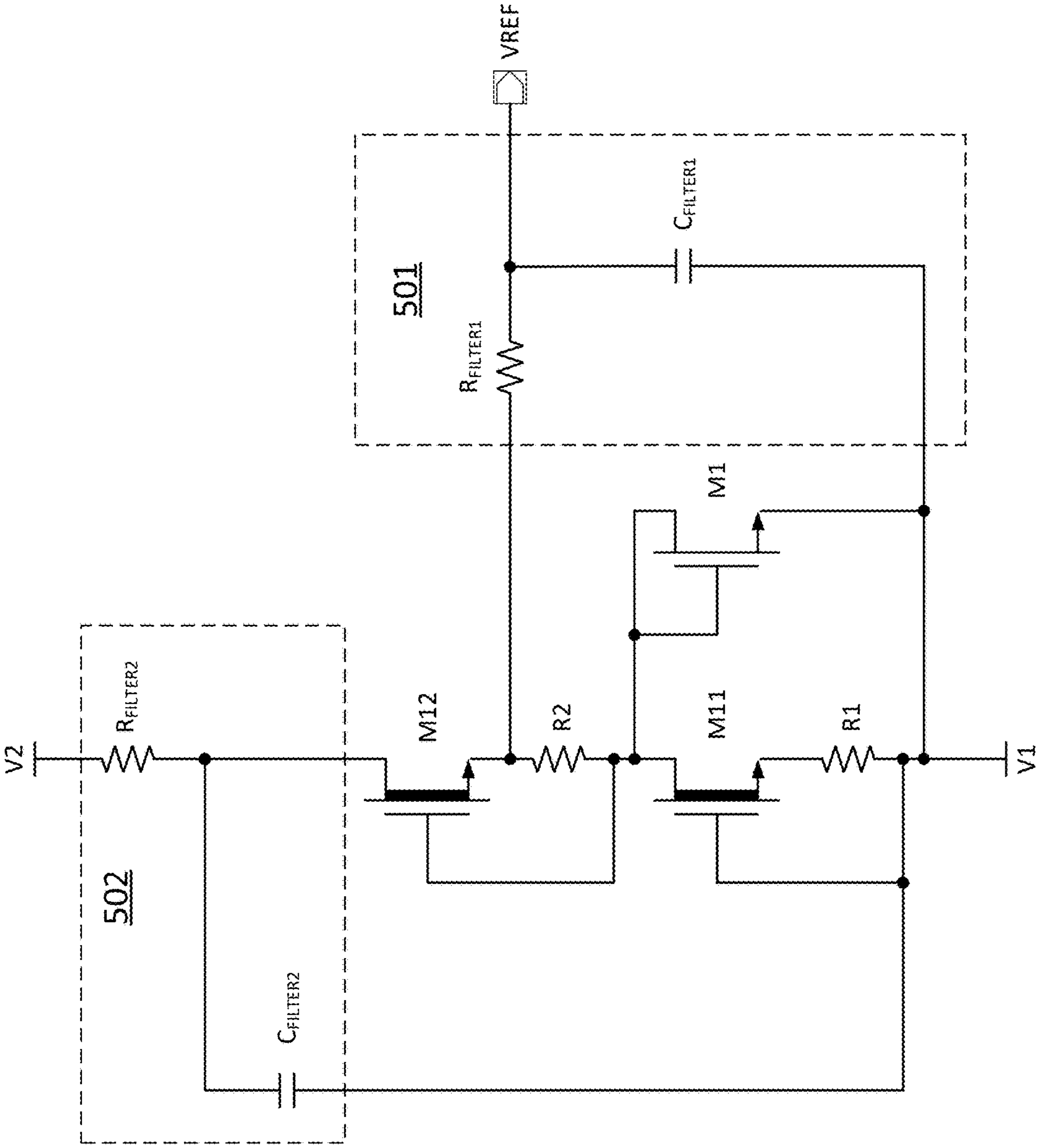
FIG. 5 illustrates a schematic diagram of a fourth implementation of the voltage reference apparatus shown in FIG. 1 in accordance with various embodiments of the present disclosure.

FIG. 5 illustrates a schematic diagram of a fourth implementation of the voltage reference apparatus shown in FIG. 1 in accordance with various embodiments of the present disclosure. The fourth implementation of the voltage reference apparatus shown in FIG. 5 is similar to the first implementation of the voltage reference apparatus shown in FIG. 2 except that the following: a first low-pass filter 501 is connected between the common node of the second resistor R2 and the second negative threshold transistor M12, and the first voltage bus V1. A second low-pass filter 502 is connected between the second voltage bus V2 and the second negative threshold transistor M12.

As shown in FIG. 5, the first low-pass filter 501 is formed by a resistor $R_{FILTER1}$ and a capacitor $C_{FILTER1}$. The resistor $R_{FILTER1}$ is connected between the reference voltage bus, and the common node of the second resistor R2 and the second negative threshold transistor M12. The capacitor $C_{FILTER1}$ is connected between the reference voltage bus and the first voltage bus V1. The first low-pass filter 501 is employed to filter and mitigate any noise or disturbance that might exist at the reference voltage bus (VREF).

It should be noted that the diagram of the first low-pass filter 501 is merely an example, which should not unduly limit the scope of the claims. One of ordinary skill in the art would recognize many variations, alternatives, and modifications. For example, depending on design needs and different applications, the first low-pass filter 501 could accommodate any number of resistors and capacitors.

The second low-pass filter 502 is formed by a resistor $R_{FILTER2}$ and a capacitor $C_{FILTER2}$ as shown in FIG. 5. The resistor $R_{FILTER2}$ is connected between the second voltage bus V2 and the drain of the second negative threshold transistor M12. The capacitor $C_{FILTER2}$ is connected between a common node of the resistor $R_{FILTER2}$ and the second negative threshold transistor M12, and the first voltage bus V1. The second low-pass filter 502 is employed to filter and mitigate any noise or disturbance that might exist at the second voltage bus V2.

It should be noted that the diagram of the second low-pass filter 502 is merely an example, which should not unduly limit the scope of the claims. One of ordinary skill in the art would recognize many variations, alternatives, and modifications. For example, depending on design needs and different applications, the second low-pass filter 502 could accommodate any number of resistors and capacitors.

Figure 6:
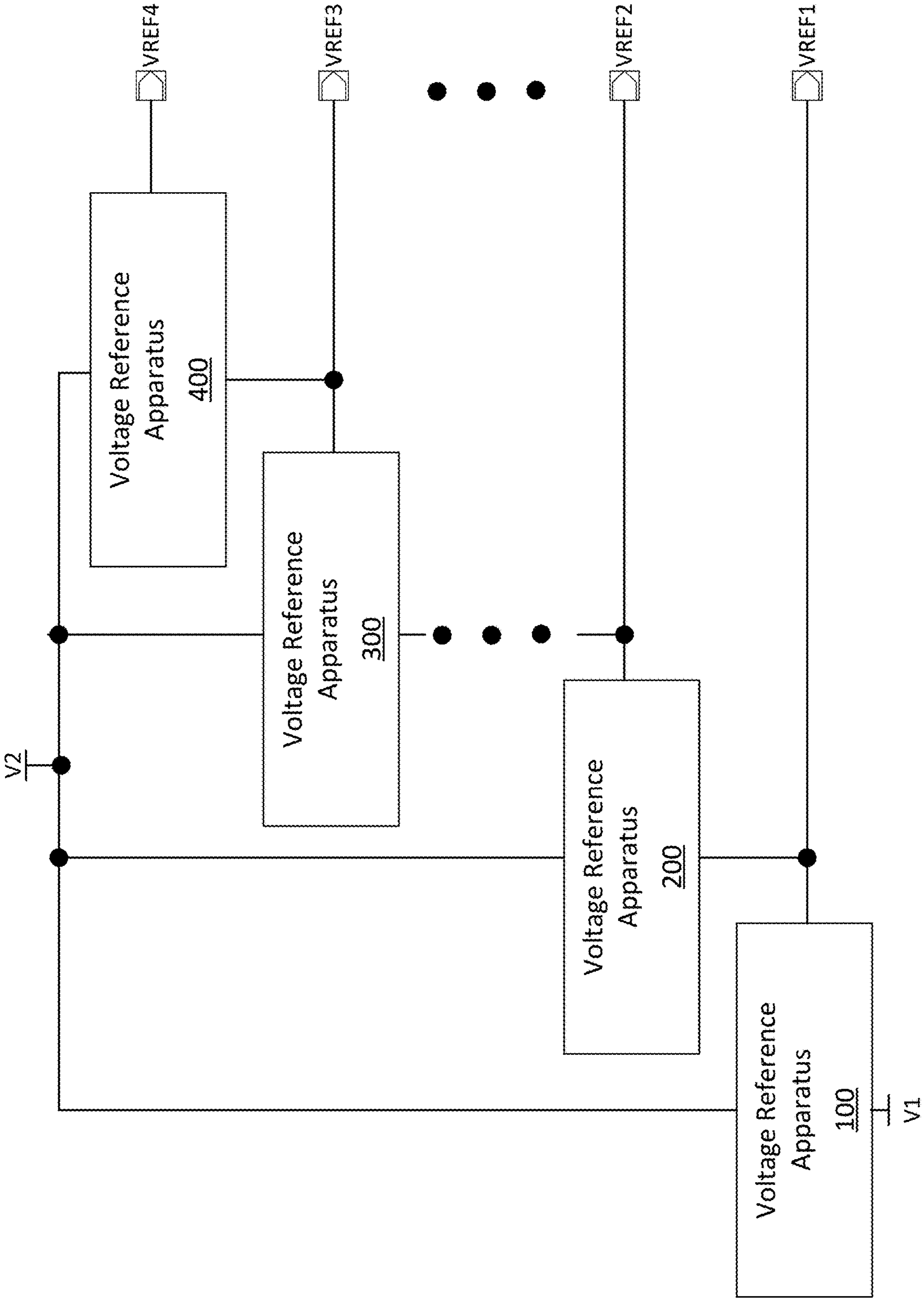
FIG. 6 illustrates a block diagram of a voltage reference system configured having multiple reference voltage outputs in accordance with various embodiments of the present disclosure.
Figure 7:
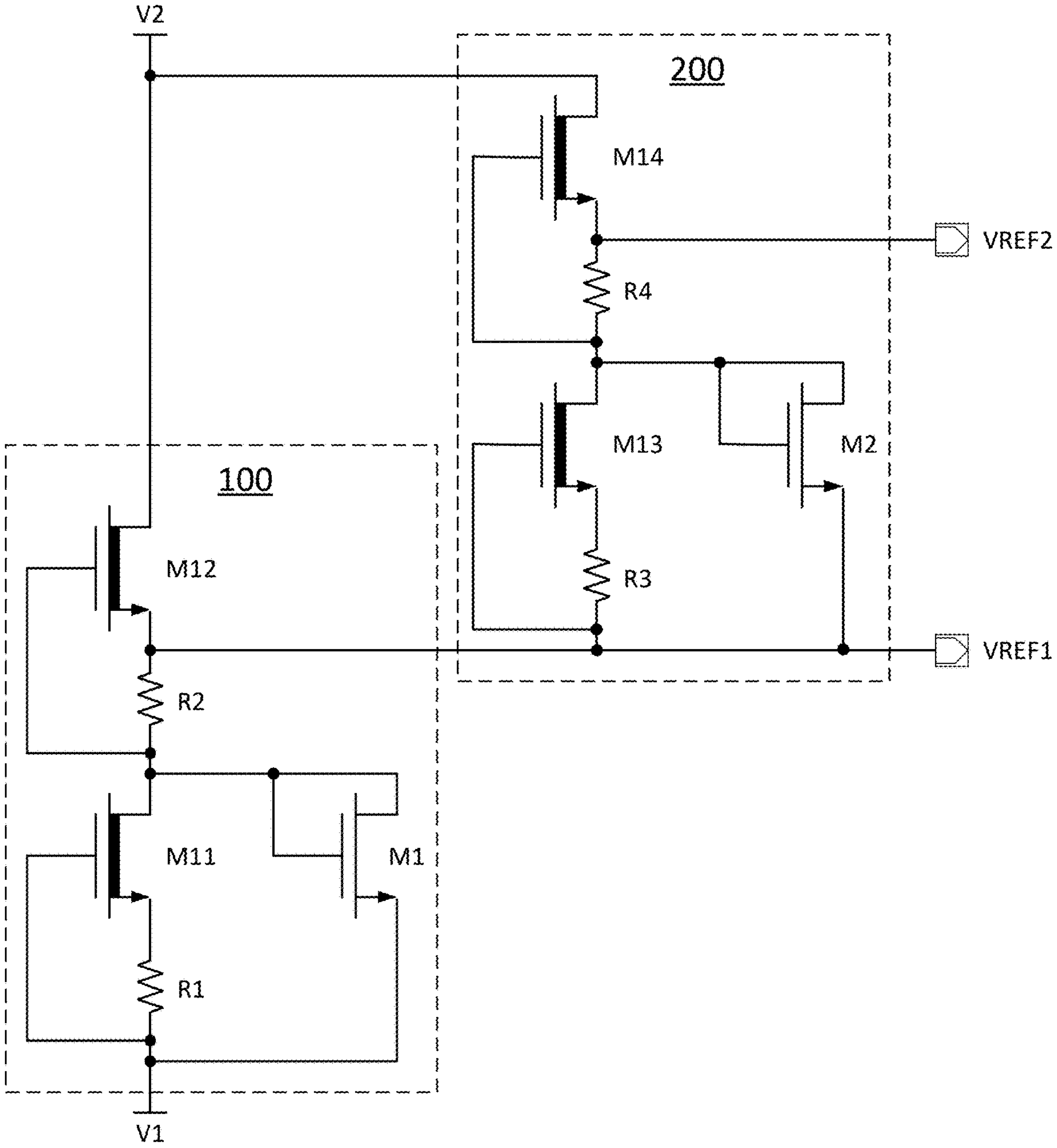
FIG. 7 illustrates a schematic diagram of a first implementation of the voltage reference system shown in FIG. 6 in accordance with various embodiments of the present disclosure.
Figure 8:
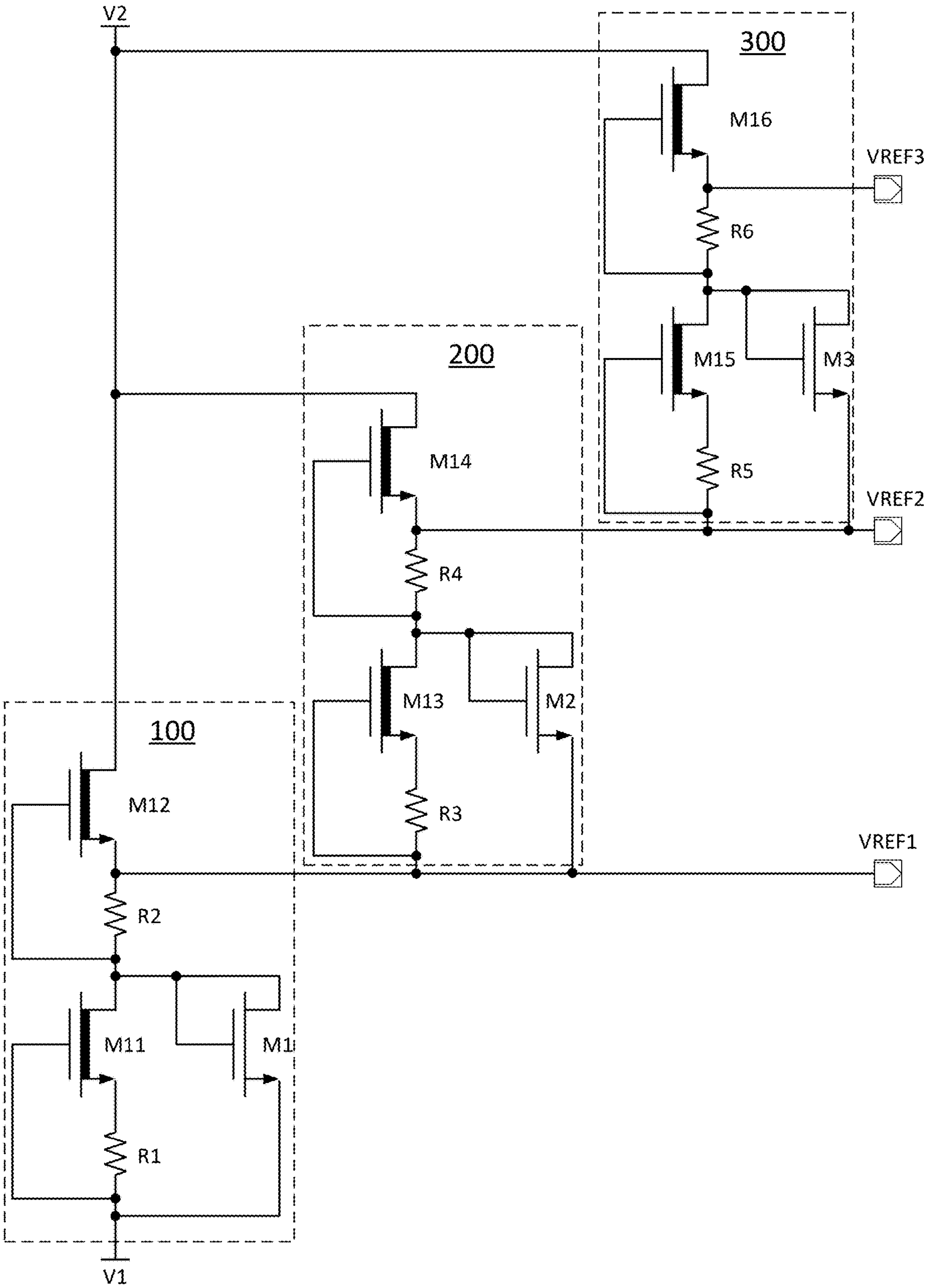
FIG. 8 illustrates a schematic diagram of a second implementation of the voltage reference system shown in FIG. 6 in accordance with various embodiments of the present disclosure.

In some embodiments, a semiconductor fabrication process allows the low voltage FET structures to be fully isolated from the semiconductor substrate of an integrated circuit. A plurality of FET-based voltage reference circuits can be stacked in series to create a plurality of voltage references. FIG. 7 shows two FET-based voltage reference circuits arranged in a double-stack configuration. FIG. 8 shows three FET-based voltage reference circuits arranged in a triple-stack configuration. In FIG. 6, any number of FET-based voltage reference circuits are arranged in a series stacked configuration to create many voltage references.

FIG. 6 illustrates a block diagram of a voltage reference system having multiple reference voltage outputs in accordance with various embodiments of the present disclosure. As shown in FIG. 6, the voltage reference system comprises a plurality of voltage reference apparatuses including a first voltage reference apparatus 100, a second voltage reference apparatus 200, a third voltage reference apparatus 300 and a fourth voltage reference apparatus 400.

In some embodiments, each voltage reference apparatus shown in FIG. 6 has a structure similar to that shown in FIG. 2. In alternative embodiments, suitable filter elements (e.g., capacitor shown in FIG. 3, an output low-pass filter shown in FIG. 4, and two low-pass filters shown in FIG. 5) may be added into each voltage reference apparatus shown in FIG. 6 to further improve the performance of the voltage reference apparatus.

As shown in FIG. 6, the plurality of voltage reference apparatuses is stacked over one another between the first voltage bus V1 and the second voltage bus V2 to form the voltage reference system configured to generate a plurality of reference voltages such as VREF1, VREF2, VREF3 and VREF4. In some embodiments, each voltage reference apparatus comprises two resistors and two negative threshold transistors coupled in series. Each voltage reference apparatus further comprises one positive threshold transistor connected in parallel with a circuit branch comprising one negative threshold transistor and one resistor. The detailed structure of each voltage reference apparatus will be described below with respect to FIGS. 7-8.

FIG. 7 illustrates a schematic diagram of a first implementation of the voltage reference system shown in FIG. 6 in accordance with various embodiments of the present disclosure. The voltage reference system comprises a first voltage reference apparatus 100 and a second voltage reference apparatus 200. The second voltage reference apparatus 200 is stacked over the first voltage reference apparatus 100.

As shown in FIG. 7, the first voltage reference apparatus 100 is connected between the first voltage bus V1 and the second voltage bus V2. The first voltage reference apparatus 100 is configured to generate a first reference voltage VREF1 on a first reference voltage bus. The second voltage reference apparatus 200 is connected between the first reference bus and the second voltage bus V2. The second voltage reference apparatus 200 is configured to generate a second reference voltage VREF2 on a second reference voltage bus.

As shown in FIG. 7, the first voltage reference apparatus 100 comprises a first resistor R1, a first negative threshold transistor M11, a second resistor R2, a second negative threshold transistor M12 and a first positive threshold transistor M1. As shown in FIG. 7, the first resistor R1, the first negative threshold transistor M11, the second resistor R2 and the second negative threshold transistor M12 are coupled in series between the first voltage bus V1 and the second voltage bus V2. The first positive threshold transistor M1 is connected between a common node of the second resistor R2 and the first negative threshold transistor M11, and the first voltage bus V1.

As shown in FIG. 7, the second voltage reference apparatus 200 comprises a third resistor R3, a third negative threshold transistor M13, a fourth resistor R4, a fourth negative threshold transistor M14 and a second positive threshold transistor M2. As shown in FIG. 7, the third resistor R3, the third negative threshold transistor M13, the fourth resistor R4 and the fourth negative threshold transistor M14 are coupled in series between the first reference voltage bus (VREF1) and the second voltage bus V2. The second positive threshold transistor M2 is connected between a common node of the fourth resistor R4 and the third negative threshold transistor M13, and the first reference voltage bus (VREF1).

In operation, the first reference voltage VREF1 is generated on the first reference voltage bus. The first reference voltage VREF1 is equal to a sum of the voltage on the first voltage bus V1, a gate-to-source voltage of the first positive threshold transistor M1 and a source-to-gate voltage of the second negative threshold transistor M12.

The second reference voltage VREF2 is generated on the second reference voltage bus. The second reference voltage VREF2 is equal to a sum of the first reference voltage VREF1, a gate-to-source voltage of the second positive threshold transistor M2 and a source-to-gate voltage of the fourth negative threshold transistor M14.

FIG. 8 illustrates a schematic diagram of a second implementation of the voltage reference system shown in FIG. 6 in accordance with various embodiments of the present disclosure. The voltage reference system comprises a first voltage reference apparatus 100, a second voltage reference apparatus 200 and a third voltage reference apparatus 300. The second voltage reference apparatus 200 is stacked over the first voltage reference apparatus 100. The third voltage reference apparatus 300 is stacked over the second voltage reference apparatus 200.

As shown in FIG. 8, the first voltage reference apparatus 100 is connected between the first voltage bus V1 and the second voltage bus V2. The first voltage reference apparatus 100 is configured to generate a first reference voltage VREF1 on a first reference voltage bus. The second voltage reference apparatus 200 is connected between the first reference bus and the second voltage bus V2. The second voltage reference apparatus 200 is configured to generate a second reference voltage VREF2 on a second reference voltage bus. The third voltage reference apparatus 300 is connected between the second reference bus and the second voltage bus V2. The third voltage reference apparatus 300 is configured to generate a third reference voltage VREF3 on a third reference voltage bus.

As shown in FIG. 8, the first voltage reference apparatus 100 comprises a first resistor R1, a first negative threshold transistor M11, a second resistor R2, a second negative threshold transistor M12 and a first positive threshold transistor M1. As shown in FIG. 8, the first resistor R1, the first negative threshold transistor M11, the second resistor R2 and the second negative threshold transistor M12 are coupled in series between the first voltage bus V1 and the second voltage bus V2. The first positive threshold transistor M1 is connected between a common node of the second resistor R2 and the first negative threshold transistor M11, and the first voltage bus V1.

As shown in FIG. 8, the second voltage reference apparatus 200 comprises a third resistor R3, a third negative threshold transistor M13, a fourth resistor R4, a fourth negative threshold transistor M14 and a second positive threshold transistor M2. As shown in FIG. 8, the third resistor R3, the third negative threshold transistor M13, the fourth resistor R4 and the fourth negative threshold transistor M14 are coupled in series between the first reference voltage bus (VREF1) and the second voltage bus V2. The second positive threshold transistor M2 is connected between a common node of the fourth resistor R4 and the third negative threshold transistor M13, and the first reference voltage bus (VREF1).

As shown in FIG. 8, the third voltage reference apparatus 300 comprises a fifth resistor R5, a fifth negative threshold transistor M15, a sixth resistor R6, a sixth negative threshold transistor M16 and a third positive threshold transistor M3. As shown in FIG. 8, the fifth resistor R5, the fifth negative threshold transistor M15, the sixth resistor R6 and the sixth negative threshold transistor M16 are coupled in series between the second reference voltage bus (VREF2) and the second voltage bus V2. The third positive threshold transistor M3 is connected between a common node of the sixth resistor R6 and the fifth negative threshold transistor M15, and the second reference voltage bus (VREF2).

In operation, the first reference voltage VREF1 is generated on the first reference voltage bus. The first reference voltage VREF1 is equal to a sum of the voltage on the first voltage bus V1, a gate-to-source voltage of the first positive threshold transistor M1 and a source-to-gate voltage of the second negative threshold transistor M12. The second reference voltage VREF2 is generated on the second reference voltage bus. The second reference voltage VREF2 is equal to a sum of the first reference voltage VREF1, a gate-to-source voltage of the second positive threshold transistor M2 and a source-to-gate voltage of the fourth negative threshold transistor M14. The third reference voltage VREF3 is generated on the third reference voltage bus. The third reference voltage VREF3 is equal to a sum of the second reference voltage VREF2, a gate-to-source voltage of the third positive threshold transistor M3 and a source-to-gate voltage of the sixth negative threshold transistor M16.

It should be noted that in FIGS. 1-8, each n-type transistor has a body/bulk terminal. The body/bulk terminal of the n-type transistor may be connected to its source terminal or another convenient circuit node. For the sake of clarity, the drawings do not show the body/bulk connections of the n-type transistors.

Figure 9:
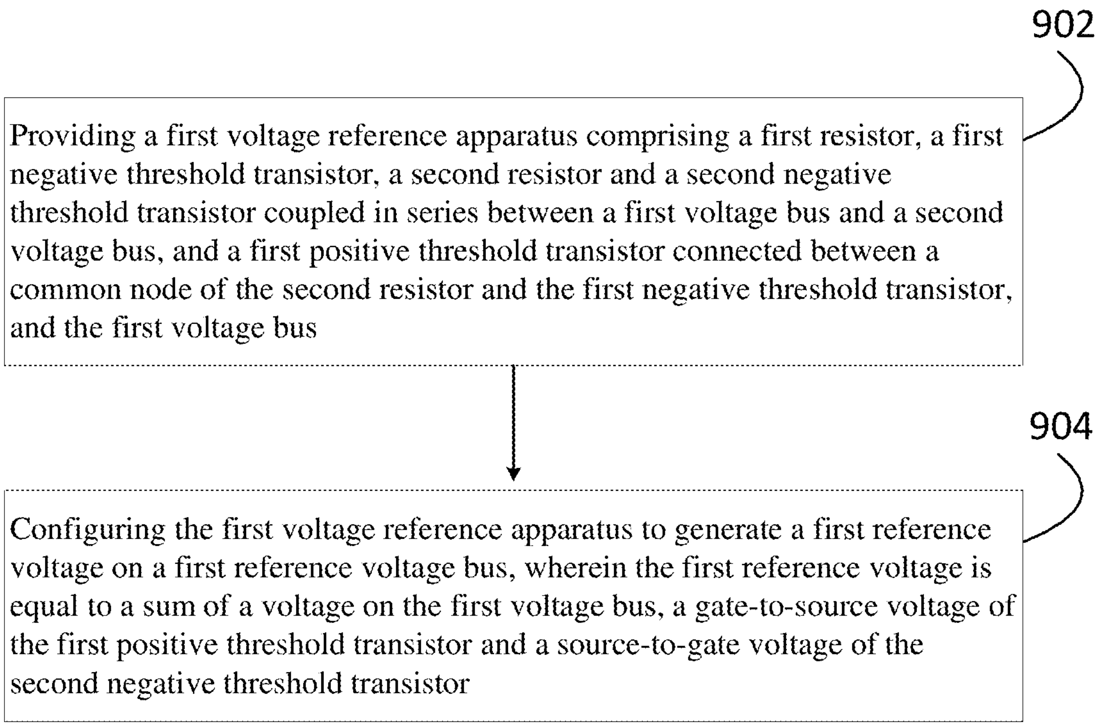
FIG. 9 illustrates a flow chart of a method for controlling the voltage reference apparatus shown in FIG. 1 in accordance with various embodiments of the present disclosure.

FIG. 9 illustrates a flow chart of a method for controlling the voltage reference apparatus shown in FIG. 1 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, a first voltage reference apparatus is provided. The first voltage reference apparatus comprises a first resistor, a first negative threshold transistor, a second resistor and a second negative threshold transistor coupled in series between a first voltage bus and a second voltage bus, and a first positive threshold transistor connected between a common node of the second resistor and the first negative threshold transistor, and the first voltage bus.

At step 904, the first voltage reference apparatus is configured to generate a first reference voltage on a first reference voltage bus, wherein the first reference voltage is equal to a sum of a voltage on the first voltage bus, a gate-to-source voltage of the first positive threshold transistor and a source-to-gate voltage of the second negative threshold transistor.

In some embodiments, the first reference voltage bus is connected to a common node of a source of the second negative threshold transistor and the second resistor.

In some embodiments, a drain of the first negative threshold transistor is connected to the second resistor, a source of the first negative threshold transistor is connected to the first resistor, a gate of the first negative threshold transistor is connected to the first voltage bus, a drain of the second negative threshold transistor is connected to the second voltage bus, a source of the second negative threshold transistor is connected to the second resistor, a gate of the second negative threshold transistor is connected to the common node of the second resistor and the first negative threshold transistor, a drain of the first positive threshold transistor is connected to the common node of the second resistor and the first negative threshold transistor, a source of the first positive threshold transistor is connected to the first voltage bus, and a gate of the first positive threshold transistor is connected to the common node of the second resistor and the first negative threshold transistor.

The method further comprises providing a second voltage reference apparatus over the first voltage reference apparatus, wherein the second voltage reference apparatus comprises a third resistor, a third negative threshold transistor, a fourth resistor and a fourth negative threshold transistor coupled in series between the first reference voltage bus and the second voltage bus, and a second positive threshold transistor connected between a common node of the fourth resistor and the third negative threshold transistor, and the first reference voltage bus, and configuring the second voltage reference apparatus to generate a second reference voltage on a second reference voltage bus, wherein the second reference voltage is equal to a sum of the first reference voltage, a source-to-gate voltage of the fourth negative threshold transistor and a gate-to-source voltage of the second positive threshold transistor.

The method further comprises providing a second voltage reference apparatus over the first voltage reference apparatus and a third voltage reference apparatus over the second voltage reference apparatus, wherein the second voltage reference apparatus comprises a third resistor, a third negative threshold transistor, a fourth resistor and a fourth negative threshold transistor coupled in series between the first reference voltage bus and the second voltage bus, and a second positive threshold transistor connected between a common node of the fourth resistor and the third negative threshold transistor, and the first reference voltage bus, and the third voltage reference apparatus comprises a fifth resistor, a fifth negative threshold transistor, a sixth resistor and a sixth negative threshold transistor coupled in series between the second reference voltage bus and the second voltage bus, and a third positive threshold transistor connected between a common node of the sixth resistor and the fifth negative threshold transistor, and the second reference voltage bus, configuring the second voltage reference apparatus to generate a second reference voltage on a second reference voltage bus, wherein the second reference voltage is equal to a sum of the first reference voltage, a source-to-gate voltage of the fourth negative threshold transistor and a gate-to-source voltage of the second positive threshold transistor, and configuring the third voltage reference apparatus to generate a third reference voltage on a third reference voltage bus, wherein the third reference voltage is equal to a sum of the second reference voltage, a source-to-gate voltage of the sixth negative threshold transistor and a gate-to-source voltage of the third positive threshold transistor.

In some embodiments, the second reference voltage bus is connected to a common node of a source of the fourth negative threshold transistor and the fourth resistor, and the third reference voltage bus is connected to a common node of a source of the sixth negative threshold transistor and the sixth resistor.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:

a first resistor, a first negative threshold transistor having a first negative threshold voltage, a second resistor and a second negative threshold transistor having a second negative threshold voltage, wherein the first resistor, the first negative threshold transistor, the second resistor, and the second negative threshold transistor are coupled in series between a first voltage bus and a second voltage bus; and a first positive threshold transistor having a positive threshold voltage, wherein the first positive threshold transistor is connected between a common node of the second resistor and the first negative threshold transistor, and the first voltage bus, wherein a first reference voltage is generated on a first reference voltage bus, and wherein the first reference voltage bus is coupled to a common node of a drain/source terminal of the second negative threshold transistor and the second resistor.

2. The apparatus of claim 1, wherein:

the first voltage bus is connected to ground;

the second voltage bus is connected to a bias voltage source; and the first negative threshold transistor, the second negative threshold transistor and the first positive threshold transistor are n-type transistors.

3. The apparatus of claim 1, wherein:

a drain of the first negative threshold transistor is connected to the second resistor;

a source of the first negative threshold transistor is connected to the first resistor; and a gate of the first negative threshold transistor is connected to the first voltage bus.

4. The apparatus of claim 1, wherein:

a drain of the second negative threshold transistor is connected to the second voltage bus;

a source of the second negative threshold transistor is connected to the second resistor; and a gate of the second negative threshold transistor is connected to the common node of the second resistor and the first negative threshold transistor.

5. The apparatus of claim 1, wherein:

a drain of the first positive threshold transistor is connected to the common node of the second resistor and the first negative threshold transistor;

a source of the first positive threshold transistor is connected to the first voltage bus; and a gate of the first positive threshold transistor is connected to the common node of the second resistor and the first negative threshold transistor.

6. The apparatus of claim 1, further comprising:

a capacitor connected between the common node of the second resistor and the second negative threshold transistor, and the first voltage bus.

7. The apparatus of claim 1, further comprising:

a low-pass filter connected between the common node of the second resistor and the second negative threshold transistor, and the first voltage bus, and wherein the low-pass filter comprises a filter resistor and a filter capacitor, and wherein:

the filter resistor is connected between the common node of the second resistor and the second negative threshold transistor, and the first reference voltage bus; and the filter capacitor is connected between the first reference voltage bus and the first voltage bus.

8. The apparatus of claim 1, further comprising:

a first low-pass filter connected between the common node of the second resistor and the second negative threshold transistor, and the first voltage bus; and a second low-pass filter connected between the second voltage bus and the second negative threshold transistor, wherein the first low-pass filter comprises a first filter resistor and a first filter capacitor, and the second low-pass filter comprises a second filter resistor and a second filter capacitor, and wherein:

the first filter resistor is connected between the common node of the second resistor and the second negative threshold transistor, and the first reference voltage bus;

the first filter capacitor is connected between the first reference voltage bus and the first voltage bus;

the second filter resistor is connected between the second reference voltage bus and the second negative threshold transistor; and the second filter capacitor is connected between a common node of the second filter resistor and the second negative threshold transistor, and the first voltage bus.

9. The apparatus of claim 1, further comprising:

a third resistor, a third negative threshold transistor, a fourth resistor and a fourth negative threshold transistor coupled in series between the first reference voltage bus and the second voltage bus; and a second positive threshold transistor connected between a common node of the fourth resistor and the third negative threshold transistor, and the first reference voltage bus, wherein a second reference voltage is generated on a second reference voltage bus, and wherein the second reference voltage bus is connected to a common node of a drain/source terminal of the fourth negative threshold transistor and the fourth resistor.

10. The apparatus of claim 1, further comprising:

a third resistor, a third negative threshold transistor, a fourth resistor and a fourth negative threshold transistor coupled in series between the first reference voltage bus and the second voltage bus;

a second positive threshold transistor connected between a common node of the fourth resistor and the third negative threshold transistor, and the first reference voltage bus, wherein a second reference voltage is generated on a second reference voltage bus, and wherein the second reference voltage bus is connected to a common node of a drain/source terminal of the fourth negative threshold transistor and the fourth resistor;

a fifth resistor, a fifth negative threshold transistor, a sixth resistor and a sixth negative threshold transistor coupled in series between the second reference voltage bus and the second voltage bus; and a third positive threshold transistor connected between a common node of the sixth resistor and the fifth negative threshold transistor, and the second reference voltage bus, wherein a third reference voltage is generated on a third reference voltage bus, and wherein the third reference voltage bus is connected to a common node of a drain/source terminal of the sixth negative threshold transistor and the sixth resistor.

11. A method comprising:

providing a first voltage reference apparatus comprising a first resistor, a first negative threshold transistor having a first negative threshold voltage, a second resistor and a second negative threshold transistor having a second negative threshold voltage, wherein the first resistor, the first negative threshold transistor, the second resistor, and the second negative threshold transistor are coupled in series between a first voltage bus and a second voltage bus, and a first positive threshold transistor having a positive threshold voltage, wherein the first positive threshold transistor is connected between a common node of the second resistor and the first negative threshold transistor, and the first voltage bus; and configuring the first voltage reference apparatus to generate a first reference voltage on a first reference voltage bus, wherein the first reference voltage is equal to a sum of a voltage on the first voltage bus, a gate-to-source voltage of the first positive threshold transistor and a source-to-gate voltage of the second negative threshold transistor.

12. The method of claim 11, wherein:

the first reference voltage bus is connected to a common node of a source of the second negative threshold transistor and the second resistor.

13. The method of claim 11, wherein:

a drain of the first negative threshold transistor is connected to the second resistor;

a source of the first negative threshold transistor is connected to the first resistor;

a gate of the first negative threshold transistor is connected to the first voltage bus;

a drain of the second negative threshold transistor is connected to the second voltage bus;

a source of the second negative threshold transistor is connected to the second resistor;

a gate of the second negative threshold transistor is connected to the common node of the second resistor and the first negative threshold transistor;

a drain of the first positive threshold transistor is connected to the common node of the second resistor and the first negative threshold transistor;

a source of the first positive threshold transistor is connected to the first voltage bus; and a gate of the first positive threshold transistor is connected to the common node of the second resistor and the first negative threshold transistor.

14. The method of claim 11, further comprising:

providing a second voltage reference apparatus over the first voltage reference apparatus, wherein the second voltage reference apparatus comprises a third resistor, a third negative threshold transistor, a fourth resistor and a fourth negative threshold transistor coupled in series between the first reference voltage bus and the second voltage bus, and a second positive threshold transistor connected between a common node of the fourth resistor and the third negative threshold transistor, and the first reference voltage bus; and configuring the second voltage reference apparatus to generate a second reference voltage on a second reference voltage bus, wherein the second reference voltage is equal to a sum of the first reference voltage, a source-to-gate voltage of the fourth negative threshold transistor and a gate-to-source voltage of the second positive threshold transistor.

15. The method of claim 11, further comprising:

providing a second voltage reference apparatus over the first voltage reference apparatus and a third voltage reference apparatus over the second voltage reference apparatus, wherein:

the second voltage reference apparatus comprises a third resistor, a third negative threshold transistor, a fourth resistor and a fourth negative threshold transistor coupled in series between the first reference voltage bus and the second voltage bus, and a second positive threshold transistor connected between a common node of the fourth resistor and the third negative threshold transistor, and the first reference voltage bus; and the third voltage reference apparatus comprises a fifth resistor, a fifth negative threshold transistor, a sixth resistor and a sixth negative threshold transistor coupled in series between the second reference voltage bus and the second voltage bus, and a third positive threshold transistor connected between a common node of the sixth resistor and the fifth negative threshold transistor, and the second reference voltage bus;

configuring the second voltage reference apparatus to generate a second reference voltage on a second reference voltage bus, wherein the second reference voltage is equal to a sum of the first reference voltage, a source-to-gate voltage of the fourth negative threshold transistor and a gate-to-source voltage of the second positive threshold transistor; and configuring the third voltage reference apparatus to generate a third reference voltage on a third reference voltage bus, wherein the third reference voltage is equal to a sum of the second reference voltage, a source-to-gate voltage of the sixth negative threshold transistor and a gate-to-source voltage of the third positive threshold transistor.

16. The method of claim 15, wherein:

the second reference voltage bus is connected to a common node of a source of the fourth negative threshold transistor and the fourth resistor; and the third reference voltage bus is connected to a common node of a source of the sixth negative threshold transistor and the sixth resistor.

17. A system comprising:

a plurality of voltage reference apparatuses stacked over one another between a first voltage bus and a second voltage bus to form a voltage reference system configured to generate a plurality of reference voltages, wherein each voltage reference apparatus comprises:

two resistors and two negative threshold transistors having negative threshold voltages, wherein the two negative threshold transistors are coupled in series; and one positive threshold transistor having a positive threshold voltage, wherein the one positive threshold transistor is connected in parallel with a circuit branch comprising one negative threshold transistor and one resistor connected in series.

18. The system of claim 17, wherein the voltage reference system comprises a second voltage reference apparatus stacked over a first voltage reference apparatus, and wherein:

the first voltage reference apparatus comprises a first resistor, a first negative threshold transistor, a second resistor and a second negative threshold transistor coupled in series between the first voltage bus and the second voltage bus, and a first positive threshold transistor connected between a common node of the second resistor and the first negative threshold transistor, and the first voltage bus, and wherein a first reference voltage is generated on a first reference voltage bus, and wherein the first reference voltage bus is connected to a source of the second negative threshold transistor and the second resistor; and the second voltage reference apparatus comprises a third resistor, a third negative threshold transistor, a fourth resistor and a fourth negative threshold transistor coupled in series between the first reference voltage bus and the second voltage bus, and a second positive threshold transistor connected between a common node of the fourth resistor and the third negative threshold transistor, and the first reference voltage bus, and wherein a second reference voltage is generated on a second reference voltage bus, and wherein the second reference voltage bus is connected to a source of the fourth negative threshold transistor and the fourth resistor.

19. The system of claim 17, wherein the voltage reference system comprises a second voltage reference apparatus stacked over a first voltage reference apparatus, and a third voltage reference apparatus stacked over the second voltage reference apparatus, and wherein:

the first voltage reference apparatus comprises a first resistor, a first negative threshold transistor, a second resistor and a second negative threshold transistor coupled in series between the first voltage bus and the second voltage bus, and a first positive threshold transistor connected between a common node of the second resistor and the first negative threshold transistor, and the first voltage bus, and wherein a first reference voltage is generated on a first reference voltage bus, and wherein the first reference voltage bus is connected to a source of the second negative threshold transistor and the second resistor;

the second voltage reference apparatus comprises a third resistor, a third negative threshold transistor, a fourth resistor and a fourth negative threshold transistor coupled in series between the first reference voltage bus and the second voltage bus, and a second positive threshold transistor connected between a common node of the fourth resistor and the third negative threshold transistor, and the first reference voltage bus, and wherein a second reference voltage is generated on a second reference voltage bus, and wherein the second reference voltage bus is connected to a source of the fourth negative threshold transistor and the fourth resistor; and the third voltage reference apparatus comprises a fifth resistor, a fifth negative threshold transistor, a sixth resistor and a sixth negative threshold transistor coupled in series between the second reference voltage bus and the second voltage bus, and a third positive threshold transistor connected between a common node of the sixth resistor and the fifth negative threshold transistor, and the second reference voltage bus, and wherein a third reference voltage is generated on a third reference voltage bus, and wherein the third reference voltage bus is connected to a source of the sixth negative threshold transistor and the sixth resistor.

20. The system of claim 17, wherein:

the first voltage bus is connected to ground; and the second voltage bus is connected to a bias voltage source.

* * * * *